US008744406B2

(12) United States Patent
Ennesser et al.

(10) Patent No.: US 8,744,406 B2
(45) Date of Patent: Jun. 3, 2014

(54) PROACTIVE COMMANDS OVER SECURE CHANNEL BETWEEN A MOBILE EQUIPMENT AND A UICC

(75) Inventors: Francois Ennesser, Meudon (FR); Nicolas Joubert, Meudon (FR); Florent Labourie, Meudon (FR); Nicolas Roussel, Meudon (FR)

(73) Assignee: Gemalto SA, Meudon (FR)

( * ) Notice: Subject to any disclaimer, the term of this patent is extended or adjusted under 35 U.S.C. 154(b) by 26 days.

(21) Appl. No.: 13/512,344

(22) PCT Filed: Dec. 7, 2010

(86) PCT No.: PCT/EP2010/069110
§ 371 (c)(1),
(2), (4) Date: May 28, 2012

(87) PCT Pub. No.: WO2011/070038
PCT Pub. Date: Jun. 16, 2011

(65) Prior Publication Data
US 2012/0238244 A1    Sep. 20, 2012

(30) Foreign Application Priority Data
Dec. 8, 2009    (EP) .................................... 09306197

(51) Int. Cl.
*H04M 1/66*    (2006.01)
*H04M 1/68*    (2006.01)
*H04M 3/16*    (2006.01)

(52) U.S. Cl.
USPC .......................................... 455/410; 455/411

(58) Field of Classification Search
USPC ................................. 455/410, 411
See application file for complete search history.

(56) References Cited

U.S. PATENT DOCUMENTS

| 6,216,014 B1* | 4/2001 | Proust et al. ................. 455/558 |
| 6,259,908 B1* | 7/2001 | Austin .......................... 455/411 |
| 7,047,405 B2* | 5/2006 | Mauro ........................... 713/166 |
| 7,286,852 B2* | 10/2007 | Imura ........................... 455/558 |
| 7,398,532 B1* | 7/2008 | Barber et al. ................. 719/328 |
| 7,694,328 B2* | 4/2010 | Joshi et al. ....................... 726/2 |
| 8,209,550 B2* | 6/2012 | Gehrmann ..................... 713/193 |

(Continued)

FOREIGN PATENT DOCUMENTS

WO    WO2005115028 A1    12/2005
WO    WO2009027743 A2    3/2009

OTHER PUBLICATIONS

PCT/EP2010/069110, International Search Report, Jan. 28, 2011, European Patent Office, P.B. 5818 Patentlaan 2, NL—2280 HV Rijswijk.

(Continued)

*Primary Examiner* — Nathan Mitchell
(74) *Attorney, Agent, or Firm* — The Jansson Firm; Pehr B. Jansson

(57) ABSTRACT

The invention relates to a UICC comprising a toolkit applet. The UICC comprises a toolkit security component for establishing and using a secure channel for proactive commands and events exchanged by the toolkit applet of the UICC with a mobile equipment. Other communications between the UICC and the mobile equipment take place outside of this secure channel. The invention also relates to a system comprising a UICC of the above type and a mobile equipment, such as a cell phone. The invention also relates to a method to selectively protect a UICC.

10 Claims, 1 Drawing Sheet

(56) References Cited

U.S. PATENT DOCUMENTS

| | | | |
|---|---|---|---|
| 2003/0046567 A1* | 3/2003 | Carman | 713/193 |
| 2003/0069886 A1* | 4/2003 | Jaskiewicz | 707/10 |
| 2006/0090084 A1* | 4/2006 | Buer | 713/189 |
| 2007/0060200 A1* | 3/2007 | Boris et al. | 455/558 |
| 2007/0067617 A1* | 3/2007 | Tarkkala | 713/2 |
| 2007/0117550 A1* | 5/2007 | Boris et al. | 455/414.1 |
| 2007/0154014 A1 | 7/2007 | Aissi et al. | |

OTHER PUBLICATIONS

PCT/EP2010/069110, Written Opinion of the International Searching Authority, Jan. 28, 2011, European Patent Office, P.B. 5818 Patentlaan 2, NL—2280 HV Rijswijk.

* cited by examiner

PROACTIVE COMMANDS OVER SECURE CHANNEL BETWEEN A MOBILE EQUIPMENT AND A UICC

BACKGROUND

1. Field of the Invention

The invention relates to an improved UICC (Universal Integrated Circuit Card).

2. Description of the Related Art

A UICC is a smart card used in mobile equipments in order to authenticate a subscriber to a network operator. It is used in particular on GSM networks (the UICC then typically embeds a SIM application) or 3G Networks (such as UMTS, for which the UICC embeds a USIM application).

The expression mobile equipment (or ME) is defined in particular in the context of GSM or UMTS, but can be extended by analogy to any other mobile network technology. A mobile equipment is a terminal (e.g. cell phone, PDA, laptop computer, etc.), equipped with an emitter-receiver for radio communications with a base station of the mobile network (e.g. a BTS for GSM networks, a Node B for UMTS networks . . . ), which is able to manage radio resources, to establish communications and manage roaming, and which has a user interface. A mobile equipment associated with a UICC forms a mobile station. Normally a mobile equipment cannot establish any mobile communication without a UICC (but there is typically at least one exception: emergency numbers are usually always available). A mobile equipment is typically identified by a unique serial number (such as the IMEI, International Mobile Equipment Identity).

As explained for example on http://en.wikipedia.org/wiki/UICC, a UICC may contain several applications, and can therefore grant access to different networks (such as both GSM and UMTS networks), and also provide storage of a phone book and other applications. It is also possible to access a GSM network using an USIM application or to access UMTS networks using a SIM application if the mobile equipment is properly configured. The telephone book is typically a separate application and not part of either subscription information module. With UMTS release 5, a new application called ISIM (for "IP multimedia Services Identity Module") is required for services in the IMS. The IMS ("IP Multimedia Subsystem") is an architectural framework for delivering Internet Protocol (IP) multimedia services. It was originally designed by the wireless standards body 3rd Generation Partnership Project (3GPP), as a part of the vision for evolving mobile networks beyond GSM. Its original formulation (3GPP R5) represented an approach to delivering "Internet services" over GPRS. This vision was later updated by 3GPP, 3GPP2 and TISPAN by requiring support of networks other than GPRS, such as Wireless LAN, CDMA2000 and fixed line.

In a CDMA network, the UICC typically needs to contain a CSIM application, and can also contain 3GPP USIM and SIM applications in order to be able to be inserted into CDMA, GSM, or UMTS handsets, and connect to the network properly in all three cases.

In 2G networks, the SIM card and SIM application were bound together, and the expression "SIM card" referred to the physical card with the SIM application. In 3G networks, it is not very rigorous to speak of a USIM, CSIM, or SIM card, as all three are applications running on a UICC.

A UICC typically comprises a CPU, a few kilobytes of RAM, some ROM (or Flash) for the operating system, some EEPROM (or Flash) for storing data, and I/O circuits. A UICC typically has no power supply (no battery, etc.) but instead receives energy from the mobile equipment. Consequently the UICC typically has no time reference (whenever the UICC is powered down by the mobile equipment, it typically loses its RAM contents and it totally stops working until it is powered up again). Therefore when the UICC wishes to take an action which involves time, date, or measurement of durations, it typically has to rely on the mobile equipment (which needs to provide the requested information). The first UICC were big (usually 85×54 mm) smart cards. Current ones are smaller (typically 25×15 mm, or even less). The UICC formats being standardized, a subscriber can easily move a UICC from one mobile equipment to another, and accordingly transfer the mobile network account to the other mobile equipment.

The use and contents of a UICC can be protected by use of PIN codes. One code, PIN1, can be defined to control normal use of the mobile equipment. Another code, PIN2, can be set, to allow the use of special functions (like limiting outbound telephone calls to a list of numbers). Unblocking codes (called PUK1 and PUK2) can be used to reset the PIN codes (PIN1 and PIN2 respectively).

Historically, UICC were "slave" devices, in the sense that a master device (typically the mobile equipment) was the one deciding when to send a command to the UICC. The UICC was only able to execute what it was requested to execute, and at the time defined by the master. However this became unpractical in certain situations. Indeed, the UICC may have to interact with the subscriber, while it typically has no screen, no keyboard, and more generally no user interface. It is therefore beneficial for the UICC to have the possibility to use the user interfaces of the mobile equipment. In some instance it is desirable for the UICC to behave as a master and send "orders" to the mobile equipment. To that end, a technology usually referred to as "SIM Application Toolkit" (SAT), was developed in the nineties, and was originally standardized in particular in GSM 11.14 ("Specification of the SIM Application Toolkit (SAT) for the Subscriber Identity Module—Mobile Equipment (SIM-ME) interface"). More recent standard linked to the emergence of 3G networks comprise in particular ETSI TS 102 221 ("Smart Cards; UICC-Terminal interface; Physical and logical characteristics") and ETSI TS 102 241 ("Smart Cards; UICC Application Programming Interface (UICC API) for Java Card™"), and do not fundamentally change the SAT technology. The principle is that the UICC can embed a toolkit applet which informs the mobile equipment that it wishes to send a command (called proactive command, because it does originate from the UICC itself and not from the mobile equipment, which is the master). The mobile equipment can then retrieve the proactive command, execute it, and send the results to the UICC. This is explained in particular in ETSI TS 102 221 V8.2.0 (2009-06), page 49, paragraph 7.4.2.1 ("Proactive command"), which states that when the UICC has a pending proactive command that it wishes to send to the mobile equipment (called the terminal in this context), it can, next time it receives a command APDU (noted C-APDU), return in the response APDU (noted R-APDU), instead of the status word 9000 (which means that the C-APDU was carried out properly), a special status word 91XX. Therefore, when the mobile equipment receives a status word 91XX instead of 9000, it knows that it has to retrieve a proactive command from the UICC, and that the proactive command is coded on XX bytes. The mobile equipment can retrieve the proactive command by sending to the UICC an APDU called "FETCH". The FETCH APDU is standardized (the class is 80, and the instruction is 12). The mobile equipment can then execute the proactive command (which can be a command to display a menu, to request a keyboard input, etc.). Once the proactive command is executed, the mobile equipment can send an APDU called "TERMINAL RESPONSE" (standardized as well, with a class 80 and an instruction code 14), in order to provide the output of the proactive command to the UICC. As explained in particular in ETSI TS 102 241 V8.0.0 (2008-06), page 19 paragraph 6.4 ("Proactive command handling"), it has been decided to centralize the management of the proactive commands (management of the special 91XX status words, of the FETCH APDUs and TERMINAL RESPONSE APDUs . . . ) in the CAT runtime environment. Therefore the CAT runtime environment can manage the toolkit protocol on behalf of the toolkit applets. The toolkit applets do not need to worry about this protocol aspect. Instead, the toolkit applet can simply call a method called SEND in the standard TS 102 241. The SEND method is part of the uicc.toolkit.ProactiveHandler API and is defined as follows:

byte send ( )
 throws ToolkitException
 Sends the current Proactive command.
 Returns:
 general result of the command (first byte of Result TLV in Terminal Response)
 Throws:
 ToolkitException—with the following reason codes:
 UNAVAILABLE_ELEMENT if the Result Comprehension TLV is missing.
 OUT_OF_TLV_BOUNDARIES if the general result byte is missing in the Result Comprehension TLV.
 COMMAND_NOT_ALLOWED if the Proactive command to be sent or one of its parameter is not allowed by the CAT Runtime Environment.

A difference between Java Card™ applets and a toolkit applets is that toolkit applets do not handle APDUs directly. Toolkit applets can handle higher level messages, e.g. thanks to the SEND method. The execution of the SEND method can span over multiple APDUs (the proactive protocol commands: FETCH, TERMINAL RESPONSE). A toolkit applet can also be triggered by an event to which it has registered. The application triggering portion of the CAT Runtime Environment is responsible for the activation of Toolkit applets, based on the APDU received by the UICC. A Translator of the CAT Runtime Environment translates the received APDUs into events, which are passed to a triggering entity. The triggering entity checks the toolkit registry in order to see which toolkit applet (if any) registered to the corresponding event, and accordingly it triggers the corresponding toolkit applet.

This mechanism is used for example in prepaid UICC subscriptions. A prepaid UICC typically decrements a counter at regular intervals (e.g. every second) after a communication has been established, and when the counter reaches zero, it is no longer possible to communicate (the subscriber needs to purchase new credits). Unfortunately, the UICC is in general not able to measure time and relies on the mobile equipment. The UICC typically registers to a timer expiration event. Consequently, when the timer expires in the mobile equipment, a toolkit applet is automatically triggered in the UICC and decrements the subscription counter accordingly.

Since a UICC is a security device, it often needs to communicate securely with a third party. The standard TS 102 484, which latest version is V7.5.0 (2009-10), entitled "Smart Cards; Secure channel between a UICC and an end-point terminal" specifies the technical implementation of the secure channel requirements specified in TS 102 412 (C.F. in particular page 18, paragraph 4.5 "Secure channel to secure local terminal interfaces" of ETSI TS 102 412 V9.1.0, 2009-06). TS 102 484 specifies four types of secured data transport protocols:

TLS—Application to Application
 Secured APDU—Application to Application
 IPsec—USB class to USB class
 Secured APDU—Platform to Platform For the last one (Secured APDU—Platform to Platform), TS 102 484 specifies (page 22, paragraph 9) that "The Platform to platform APDU channel shall only be set up on logical channel 0, and while a platform to platform secure channel is active, the UICC shall reject APDUs on any other logical channel. It shall be possible to use logical channels in the encrypted APDU payload". At the same time an Application to Application—APDU Secure channel cannot secure proactive commands (sent on logical channel 0 according to the standard) as it can only secure a non-0 logical channel, i.e. any logical channel except logical channel 0.

It turns out that with current versions of the standards, the only way to secure proactive commands consists in systematically encrypting all communications between the UICC and the mobile equipment. This is very inconvenient (the execution is slower, and some information which is not necessarily sensitive ends up being encrypted anyway), but it is a constraint of the current standard (TS 102 484).

SUMMARY OF THE INVENTION

One object of the invention is therefore to overcome this limitation of currently standardized secure channels. Another object of the invention is to improve the security of prepaid subscriptions which are managed by UICCs using proactive commands.

BRIEF DESCRIPTION OF THE DRAWINGS

The invention and its advantages will be explained in more detail in the following specification referring to the appended drawing, in which.

DETAILED DESCRIPTION

Figure 1:
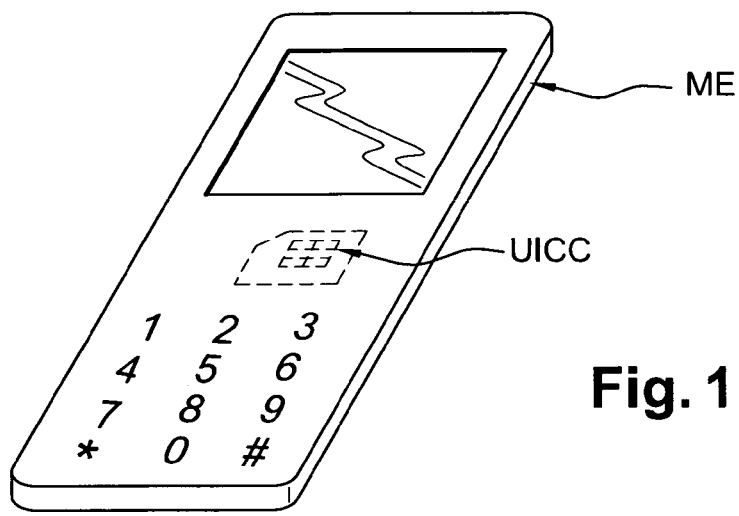
FIG. 1 represents a system according to the invention, comprising a mobile equipment ME (a cell phone), and a UICC inserted inside the mobile equipment.
Figure 2:
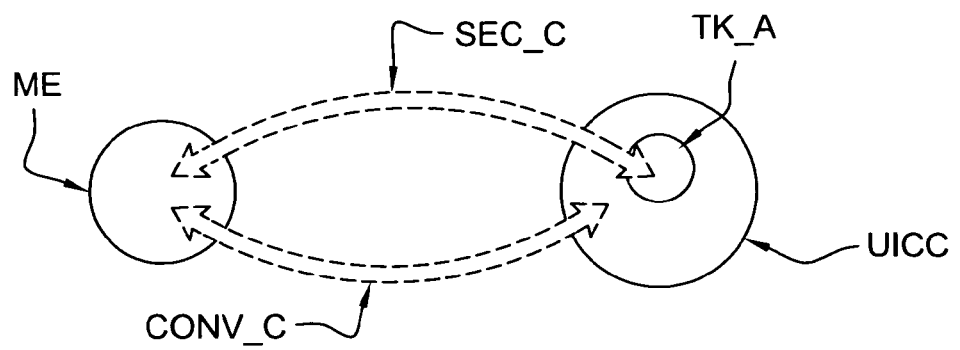
FIG. 2 represents a logical view of communications aspects of the system of FIG. 1.

On FIG. 1, the UICC is represented in dashed lines since it cannot be seen without opening the mobile equipment (unless the mobile equipment is made of transparent materials). On FIG. 2, a toolkit applet TK_A is loaded into the UICC, and two communication channels are shown, a conventional communication channel CONV_C, and a secure channel SEC_C according to the invention. The secure channel SEC_C is represented as going from the mobile equipment ME to the toolkit applet TK_A, but this is only a logical view, since in reality the secure channel is typically not managed by the toolkit applet itself, but by dedicated component of the UICC, on behalf of the toolkit applet.

A UICC according to the invention comprises a toolkit applet (i.e. an applet able to send proactive commands to a mobile equipment). The UICC further comprises a toolkit security component. The toolkit security component can be a piece of software (e.g. in the form of a library), or a piece of hardware, or a combination of hardware and software. The toolkit security component is designed to establish a secure channel for securely sending proactive commands from the toolkit applet of the UICC to a mobile equipment. The secure channel can also be used to convey secure events as will be seen later. The secure channel is established according to state of the art techniques such as the ones described in TS 102 484, and preferably relies on certificates, although symmetric cryptography is a possibility as well (but may pose key distribution difficulties). The UICC could optionally query for the validity of a mobile equipment certificate each time it is inserted in a new mobile equipment (with a new certificate). The toolkit applet can rely on the toolkit security component in order to decide to protect (or not) the proactive commands it sends to mobile equipment. The secure channel established by the toolkit security component therefore protects support commands such as the FETCH commands (APDUs sent by the mobile equipment in order to retrieve the proactive commands from the UICC) or the TERMINAL RESPONSE commands (APDUs sent by the mobile equipment to the UICC in order to inform the UICC of the result of the execution of the proactive command). Other communications between the UICC and the mobile equipment take place outside of this secure channel, which is advantageous, since it is now possible to selectively secure proactive commands. An evolution of TS 102 484 (which is a very recent ETSI standard) might be desirable in order to avoid a proprietary solution, but is not mandatory (in many instances, it is possible to use proprietary solutions).

In a preferred embodiment, the toolkit security component comprises a SENDSECURE method. The toolkit applet is set to call the SENDSECURE method instead of the standard SEND method when it needs to dispatch any sensitive proactive command. The SENDSECURE method carries out the same task as the standard SEND method but through the secure channel. The SENDSECURE method can therefore have the following declaration:

byte sendsecure ( )
 throws ToolKitExcetion.
 Sends the current Proactive command through a specified application to application secure channel.
 Returns:
 general result of the command (first byte of Result TLV in Terminal Response)

The SENDSECURE method can therefore check the existence of an appropriate secure channel and use it (and throw an exception in absence of appropriate secure channel). Alternatively, the SENDSECURE method can trigger the opening of the secure channel (for that purpose it preferably instructs an existing UICC component responsible for managing secure channels to open the secure channel). It is also possible to optionally pass an identifier of an already opened secure channel as an input parameter to the SENDSECURE method, so that the SENDSECURE method does not have to manage the opening of the secure channel, nor to check the existence of a default secure channel. Alternatively, it is also possible to pass, as an input parameter to SENDSECURE, some parameters of the desired secure channel (e.g. type of cryptographic algorithms, etc.), in order to not let the UICC open a "default" type of secure channel which would not necessarily be appropriate. It might be desirable to standardize the SENDSECURE command (e.g. update TS 102 241).

According to a preferred embodiment, the UICC is set, after a SENDSECURE method is called, to return a specific status word in order to inform the mobile equipment that the mobile equipment must send a FETCH command to the UICC in order to retrieve the proactive command, and that the FETCH must be sent through the secure channel. The standard status word signaling proper execution is status word 9000. A modified status word signaling that execution was correct but that the UICC also has a proactive command that the mobile equipment is expected to retrieve (with a FETCH command) has been standardized, and it is status word 91XX (XX indicates the size in bytes of the proactive command to retrieve). According to the invention, yet another status word, e.g. YYXX, could be used to inform the mobile equipment not only of the presence of a proactive command but also of the need for a secure channel for that proactive command. YY can be any appropriate byte chosen for that purpose, it can be chosen arbitrarily as long as it does not conflict with existing standard status words. For example it is possible to decide that YY should be equal to byte 88. XX should keep the same meaning as in 91XX (i.e. it is the length of the proactive command to retrieve).

According to a preferred embodiment, after the UICC has returned the specific status word (e.g. 88XX), it is set to reject any command not received through the secure channel, and which is not a "Manage Secure Channel" command as described in TS 102 221 (and TS 102 484). The UICC could even stop responding until the expected proactive command is properly managed on the proper secure channel. This can in particular render attacks from hackers trying to circumvent the secure channel protection more difficult.

According to a preferred embodiment, when the UICC is set to register the toolkit applet to an event such as one of the events specified in ETSI TS 102 241, it may choose to register for a secure version of the event, so that the toolkit applet is triggered after such secure event is detected. A secure event is an event notified by the mobile equipment through the secure channel. The secure event can be for example the expiration of a timer managed by the mobile equipment on behalf of the UICC. This can be used for example to manage a prepaid account on the UICC. The UICC may ask the mobile equipment to send it a time reference at regular intervals. When the reference is received (which means that a predefined delay has expired), the UICC can decrement a prepaid mobile telephony subscription counter. A hacker could still try to intercept the secure events. But the removal of one element (e.g. one or more timer expiration events) in the secure channel can be noticed by the UICC with a proper protocol (such as a counter counting both on UICC side and mobile equipment side the number of elements sent, as specified in TS 102 484). This makes the attacks more difficult to carry out. Of course, if the hacker manages to take full control of the mobile equipment, he can manage the secure channel with the UICC as he wants. But taking full control of the mobile equipment is more complex than current basic man in the middle attacks, which do not necessarily require compromising the mobile equipment (it is sometimes enough to put an electronic interface between the mobile equipment and the UICC, and to program this electronic interface to drop the timer events, the advantage for the hacker being that this electronic interface is fully standardized, unlike the security features of each mobile equipment which vary from model to model). Furthermore mobile equipments supporting a secure channel are in general supposed to implement security features to prevent such attacks.

According to a preferred embodiment, the UICC opens an application to application secure channel on logical channel 1 with a target application that is also selected on logical channel 0. The UICC can continue to use channel 0 for non secure APDUs, while channel 1 (or in fact any other arbitrarily agreed upon channel) would be used to exchange the proactive commands that need to be secured with the secure channel. Preferably, proactive commands sent on channel 1 would still indicate, once deciphered, that they belong to logical channel 0, in order to comply with the constraints of the toolkit framework. This preferred embodiment is in contradiction with current TS 102 484 standard, which could therefore be updated in order to take advantage of this proposed feature. Alternately, the application to application secure channel used to secure proactive commands could be a dedicated "selective" secure channel that may even be established on logical channel 0 with a specific endpoint identifier reserved for such type of secure channel. This selective secure channel could multiplex proactive commands issued by several applications on the card, avoiding the need to open application to application secure channel with each target applications.

The invention is also applicable to any smartcard, such as a payment card, interacting with a terminal that may not be a mobile equipment.

The invention also relates to a system comprising a UICC and a mobile equipment. The UICC comprises a toolkit applet and a toolkit security component for establishing a secure channel for proactive commands sent by the toolkit applet of the UICC to the mobile equipment, other communications between the UICC and the mobile equipment taking place outside of this secure channel. It is possible to use in this system a UICC according to any of the previously described preferred embodiments of UICCs according to the invention.

The invention also relates to a method to selectively protect a UICC comprising a toolkit applet. The method comprises establishing a secure channel between the UICC and a mobile equipment. The secure channel is used for selected proactive commands sent by the toolkit applet of the UICC to the mobile equipment and selected events issued by the mobile equipment to the toolkit applet. Other communications between the UICC and the mobile equipment take place outside of this secure channel. It is possible to use in this method a UICC according to any of the previously described preferred embodiments of UICCs according to the invention.

The invention claimed is:

1. A UICC comprising:
   a toolkit applet; and
   a toolkit security component for establishing a secure channel for proactive commands sent by the toolkit applet of the UICC to a mobile equipment, wherein other communications between the UICC and the mobile equipment take place outside of this secure channel, the toolkit security component comprising:
      a SENDSECURE method operable to be functionally equivalent to the standard SEND method over the secure channel,
   the toolkit applet operable to call the SENDSECURE method to dispatch a proactive command over the secure channel.

2. The UICC according to claim 1, wherein the toolkit security component comprises a SENDSECURE method, wherein the toolkit applet is set to call the SENDSECURE method instead of the standard SEND method when it needs to dispatch any sensitive proactive command, wherein the SENDSECURE method carries out the same task as the standard SEND method but through the secure channel.

3. The UICC according to claim 2, wherein the UICC is set, after a SENDSECURE method is called, to return a specific status word in order to inform the mobile equipment that the mobile equipment must send a FETCH command to the UICC in order to retrieve the proactive command, and that the FETCH must be sent through the secure channel.

4. The UICC according to claim 3, wherein the UICC is set, after it has returned the specific status word, to reject all commands except
   a. commands received through the secure channel, and
   b. the "Manage Secure Channel" command.

5. The UICC according to any previous claim, wherein the UICC is set to register the toolkit applet to a secure event, wherein a secure event is an event notified by the mobile equipment through the secure channel, so that the toolkit applet is triggered after such secure event is detected.

6. The UICC according to claim 5, wherein the secure event is the expiration of a timer managed by the mobile equipment on behalf of the UICC.

7. The UICC according to any of claims 1 through 4, wherein the secure channel is an application to application secure channel opened on any non-zero logical channel with a UICC application already selected in an unsecured manner on logical channel 0.

8. The UICC according to any of claims 1 to 4, wherein the secure channel is opened on logical channel 0 with a specific endpoint identifier.

9. A system comprising a UICC and a mobile equipment, wherein the UICC comprises a toolkit applet, a toolkit security component for establishing a secure channel for proactive commands sent by the toolkit applet of the UICC to the mobile equipment, other communications between the UICC and the mobile equipment taking place outside of this secure channel, the secure channel established by operating the toolkit applet to call a SENDSECURE method of a toolkit component of the UICC in lieu of a standard SEND method to secure a proactive command, the SENDSECURE method being functionally equivalent to the standard SEND command and operable over the secure channel.

10. A method to selectively protect a UICC having a toolkit applet, the method comprising establishing a secure channel between the UICC and a mobile equipment, the secure channel being used for selected proactive commands sent by the toolkit applet of the UICC to the mobile equipment, other communications between the UICC and the mobile equipment taking place outside of this secure channel, the secure channel established by operating the toolkit applet to call a SENDSECURE method of a toolkit component of the UICC in lieu of a standard SEND method to secure a proactive command, the SENDSECURE method being functionally equivalent to the standard SEND command and operable over the secure channel.

* * * * *